Dec. 25, 1956 D. WEIGHTON ET AL 2,775,654

CIRCUIT FOR ADJUSTING AMPLITUDE DISTORTION

Filed Dec. 11, 1950

Inventor
Donald Weighton
Ladislav Lax
By
O'Boyle & Blair
Attorney 2,775,654
Patented Dec. 25, 1956

2,775,654

CIRCUIT FOR ADJUSTING AMPLITUDE DISTORTION

Donald Weighton and Ladislav Lax, Cambridge, England, assignors to Pye Limited, Cambridge, England, a British company Application December 11, 1950, Serial No. 200,134

Claims priority, application Great Britain December 16, 1949

3 Claims. (Cl. 179—171)

Figures 1, 2:
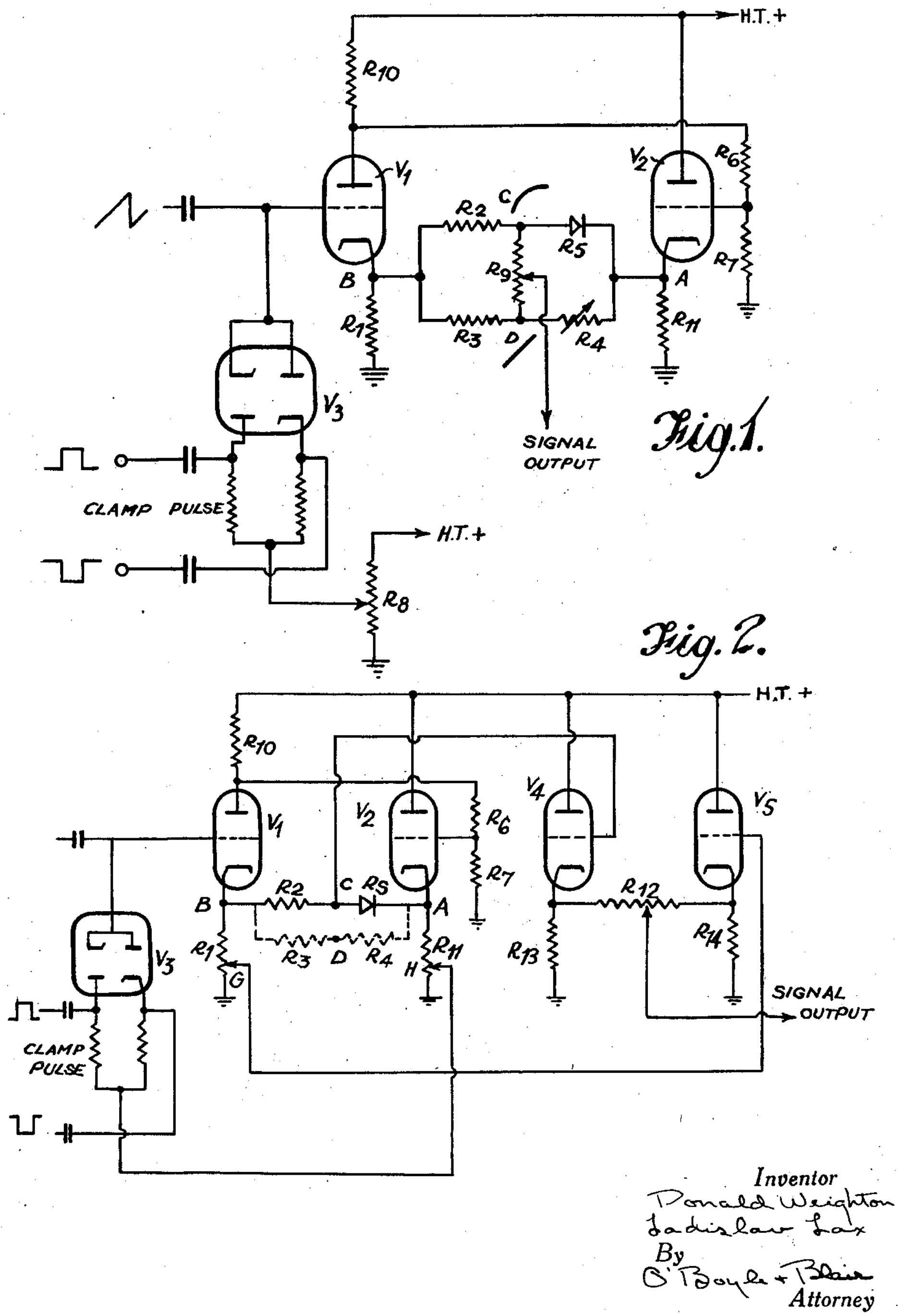

The present invention relates to a circuit for adjusting amplitude distortion and is particularly applicable to such correction in television apparatus although also applicable to other purposes.

In television apparatus the response of the pick-up tube in the transmitter and the cathode ray tube in the receiver to different values of pictures brightness is called its "gamma" value, equivalent to the use of this term in photography. The response of some pick-up tubes, such as image-iconoscope tubes, is non-linear with picture brightness, whereas other tubes, such as image-orthicons, are substantially linear. The response of receiving cathode ray tubes is non-linear and substantially compensates for the non-linearity of an image-iconoscope so that no gamma correction is necessary in the transmitter when the camera incorporates an image-iconoscope. When a camera using an image-orthicon or other pick-up tube with a different gamma value is used, however, gamma adjustment is necessary in the transmitter to introduce amplitude distortion in the transmitted signal which will be compensated by the non-linear response of the receiver cathode ray tube so that the picture reproduced on the cathode ray tube will be substantially linear with variations of picture brightness.

The present invention has for an object to provide a circuit which enables any desired degree of amplitude distortion to be introduced, whereby, for example in the case of a television transmitter, the gamma of the transmitted signal may be adjusted, in accordance with the camera being used, to produce substantially linear amplitude response at the receiver. A further object is to provide an amplitude distortion control of the kind referred to which, throughout its range of adjustment, produces subtantially no variation of the peak-to-peak voltage of the signal fed through the circuit.

According to the present invention, an amplitude distortion control circuit comprises a bridge arrangement in which one pair of arms connecting the input points of the bridge produce a non-linear characteristic at their junction point, whilst the other pair of arms produce a linear characteristic at their junction point, these two junction points being interconnected by a potentiometer having a variable tapping whereby, by shifting the tapping from one end to the other, the linearity of the output signal may be varied between the limits of the two said characteristics.

The invention also consists in an amplifier having means for controlling the amplitude distortion of the output signal without appreciable variation of the peak-to-peak voltage of the output signal, comprising an electronic valve having its control electrode, to which the input signal is fed, held at a predetermined voltage, said valve being connected as a cathode follower to the two pairs of arms of a bridge, one pair of arms comprising a linear and a non-linear element respectively and the other pair of arms each comprising linear elements, the other end of the bridge being connected to another valve in the circuit at a point which presents a very low impedance to the signal, the two pairs of arms of the bridge being shunted by a potentiometer provided with a variable tapping from which the output signal is taken.

The invention will be more clearly understood from the accompanying drawing, in which:

Fig. 1 shows a circuit arrangement of one form of amplifier embodying the invention which is suitable for controlling the gamma of a television signal and Fig. 2 shows a modified form of the circuit shown in Fig. 1.

Referring to Fig. 1, the input wave of which the amplitude distortion is to be controlled is fed to the control grid of a triode V1, the grid of which is held at a predetermined potential by means of a known pulse clamping circuit, comprising the two rectifiers V3 connected as shown to the high tension supply through the potentiometer R8, clamp pulses being fed to the circuit in known manner.

The valve V1 is provided with a resistor R1 in its cathode lead and is connected as a cathode follower to the bridge circuit comprising two pairs of arms R2, R3, R4, R5, the other end of the bridge being connected to the cathode of a triode V2 having a resistor R11 in its cathode lead and its grid connected to the anode of V1 through the resistor R6 and to earth through the resistor R7. The resistor R10 is connected in the anode lead of V1. Resistors R6, R7 and R10 are chosen in such a manner that the A. C. current due to the signal will compensate the current through the bridge network to R11, so that point A will be of a very low impedance to the signal.

The elements R2, R3, R4 of the bridge network have linear characteristics, for example resistors, R4 preferably being a variable resistance. R5 is a non-linear element, for example a rectifier. Thus the characteristic at point C of the bridge will be non-linear, whilst the characteristic at point D will be linear. These two points C and D are interconnected by a potentiometer R9 having a variable tapping from which the output signal is taken.

The clamp voltage is adjusted by means of the potentiometer R8 so that at no-signal conditions the potential difference between the points A and B will be zero. R4 is then adjusted so that the peak-to-peak voltage at points D and C are the same, whence at peak potential there will be no current in R9. Therefore any point on R9 will be at the same potential and hence the peak-to-peak voltage at all points along R9 will remain constant, whilst the linearity of the output signal will vary dependent upon the position of the potentiometer tapping.

It will be noted that the bridge circuit is D. C. connected throughout so that no change of potential of the reference level will occur with variation of the picture or waveform content. The arrangement is suitable for controlling the gamma of a television signal to be transmitted, and also for controlling the gamma of television signals to be recorded on a cinematograph film to compensate, to the desired degree, for the gamma of the film.

Fig. 2 shows a modification of the circuit arrangement of the non-linear amplifier shown in Fig. 1. The circuit connections of the valves V1, V2, and V3 are substantially as described with reference to Fig. 1, but to improve the high frequency response of the amplifier the output is not derived from a potentiometer directly connected across the points C and D but from a potentiometer R12 connected across the cathodes of two cathode follower valves V4, V5 to the signal grids of which the signals at the points C and D are respectively transferred. R13 and R14 are resistance connected in the cathode leads of the valves V4 and V5 respectively. With this arrangement the waveforms present at C and D are now reproduced at the cathodes of the valves V4, V5 respectively and between which the potentiometer R12 is connected. R12 can have a lower value than the potentiometer R9 in the circuit of Fig. 1 and consequently the frequency response characteristic is improved. The output is taken from the variable tapping on R12.

In the circuit shown in Fig. 2 the signal grid of V5 is not directly connected to the point D but to a point G on the resistance R1 in the cathode lead of valve V1. Since the waveform at D is a linear function of the input waveform, there exists a point G on resistance R1 where the same voltage is present as at D, and the signal grid of the valve V5 can be connected to this point instead of to the point D. In this case the resistors R3 and R4 can be dispensed with. The point G may be an adjustable tapping.

As the no-signal voltages at A and B are equal and the clamping voltage on the signal grid of V1 is more negative than that on its cathode, the separate potentiometer R8 of Fig. 1 may be dispensed with and the double-diode V3 returned to point H on the resistance R11, since only D. C. flows through this resistance.

The valves V1 and V2 and the double-diode V3 with their associated components constitute a negative feedback lead to direct current. This keeps constant the voltage difference, which should be nil, and improves the performance of the circuit.

Whilst a particular embodiment has been described, it will be understood that various modifications may be made without departing from the scope of the invention.

We claim:

1. An amplifier comprising a first electronic valve having an anode, a cathode and a control grid, a high tension positive supply line, means for feeding the input signal to the control grid of said electronic valve, means for maintaining said control grid at a predetermined voltage, a resistor connected between the cathode of first valve and ground, a resistor connected between the anode of the said first valve and the high tension positive supply line a second electronic valve having an anode, a cathode and a control grid, a resistor connected between the cathode of said second valve and ground, means connecting the anode of said second valve to the high tension positive supply line, a resistor chain connected between the anode of said first valve and ground, means connecting the control grid of said second valve to an intermediate point on said resistor chain, an impedance network connected between the cathodes of said two valves, one portion of said impedance network producing a non-linear amplitude characteristic and the other portion of said impedance network producing a linear amplitude characteristic, means for feeding the signals from intermediate points on said two portions respectively to the control grids of two cathode follower valves, a potentiometer connected across the cathodes of said cathode follower valves, and a variable tapping on said potentiometer from which the output signal is taken.

2. An amplifier comprising a first electronic valve, having an anode, a cathode and a control grid, a high tension positive supply line, means for feeding the input signal to the control grid of said electronic valve, means for maintaining said control grid at a predetermined voltage, a resistor connected between the cathode of said first valve and ground, a resistor connected between the anode of said first valve and the high tension positive supply line, a second electronic valve having an anode, a cathode and a control grid, a resistor connected between the cathode of said second valve and ground, means for connecting the anode of said second valve to the high tension positive supply line, a resistor chain connected between the anode of said first valve and ground, means connecting the control grid of said second valve to an intermediate point on said resistor chain, two pairs of arms of a bridge circuit connected between the cathodes of said two valves, one pair of arms comprising an element having a linear amplitude characteristic and an element having a non-linear amplitude characteristic respectively, and the other pair of arms each comprising an element having a linear amplitude characteristic, means for feeding the signals at the junction points of said pairs of arms across a potentiometer, and a variable tapping on said potentiometer from which the output signal is taken.

3. An amplitude distortion control circuit comprising a first electronic valve having an anode, a cathode and at least one grid electrode, means for feeding an input signal to said grid electrode, means for maintaining said grid electrode at a predetermined voltage, a second electronic valve having an anode, a cathode and at least one grid electrode, a D. C. connection between the anode of said first electronic valve and the grid of said second electronic valve, a positive high tension supply voltage, means connecting the anode of said first and second valves to said positive high tension supply voltage, an impedance network connected between the cathodes of said first and second valves, said impedance network having a first portion producing a signal having a non-linear amplitude characteristic, and a second portion producing a signal having a linear amplitude characteristic, a third electronic valve having an anode, a cathode and at least one grid electrode, means connecting an intermediate point on said first portion of said impedance network to said grid electrode of said third valve, a resistor connected in series between the cathode of said third valve, and ground, a fourth electronic valve having an anode, a cathode and at least one grid electrode, means connecting an intermediate point on said second portion of said impedance network to said grid electrode of said fourth valve, a resistor connected in series between the cathode of said fourth valve and ground, means connecting the anodes of said third and fourth valves to said positive high tension supply voltage, a potentiometer connected between the cathodes of said third and fourth valves, a variable tapping on said potentiometer, and means for deriving an output signal from between said variable tapping and ground.

References Cited in the file of this patent

UNITED STATES PATENTS

| | | |
|---|---|---|
| 2,225,337 | Fyler | Dec. 17, 1940 |
| 2,271,876 | Seeley | Feb. 3, 1942 |
| 2,313,096 | Shepard | Mar. 9, 1943 |
| 2,368,454 | Dome | Jan. 30, 1945 |
| 2,440,283 | Levy | Apr. 27, 1948 |
| 2,440,682 | Hansel | May 4, 1948 |
| 2,443,864 | McAuley | June 22, 1948 |
| 2,542,160 | Stoner et al. | Feb. 20, 1951 |